US011447405B2

(12) United States Patent
Gao et al.

(10) Patent No.: US 11,447,405 B2
(45) Date of Patent: Sep. 20, 2022

(54) APPARATUS TO REMOVE HARMFUL CHEMICAL SPECIES FROM INDUSTRIAL WASTEWATER USING IRON-BASED PRODUCTS

(71) Applicant: University of Kentucky Research Foundation, Lexington, KY (US)

(72) Inventors: Xin Gao, Lexington, KY (US); Kunlei Liu, Lexington, KY (US); James R. Landon, Lexington, KY (US); Jesse Thompson, Lexington, KY (US); Ayokunle O. Omosebi, Lexington, KY (US); Keemia Abad, Lexington, KY (US); Zilong Ma, Xuzhou (CN)

(73) Assignee: University of Kentucky Research Foundation, Lexington, KY (US)

(*) Notice: Subject to any disclaimer, the term of this patent is extended or adjusted under 35 U.S.C. 154(b) by 187 days.

(21) Appl. No.: 16/875,169

(22) Filed: May 15, 2020

(65) Prior Publication Data
US 2020/0361792 A1 Nov. 19, 2020

Related U.S. Application Data

(60) Provisional application No. 62/848,193, filed on May 15, 2019.

(51) Int. Cl.
*C02F 1/463* (2006.01)
*C02F 1/461* (2006.01)
(Continued)

(52) U.S. Cl.
CPC .............. *C02F 1/463* (2013.01); *C02F 1/385* (2013.01); *C02F 1/4674* (2013.01); *C02F 1/46109* (2013.01); *C02F 1/5263* (2013.01); *C02F 2001/46133* (2013.01); *C02F 2101/103* (2013.01); *C02F 2101/106* (2013.01); *C02F 2101/163* (2013.01); *C02F 2101/166* (2013.01); *C02F 2201/4619* (2013.01)

(58) Field of Classification Search
CPC ..................................................... C02F 1/463
See application file for complete search history.

(56) References Cited

U.S. PATENT DOCUMENTS 3,974,070 A 8/1976 Popov et al.
4,565,633 A 1/1986 Mayenkar
(Continued)

FOREIGN PATENT DOCUMENTS

DE 102012108399 A1 3/2014
JP 2006263699 A 10/2006
(Continued)

OTHER PUBLICATIONS

English machine translation of JP2006263699 obtained from espacenet.com on Jan. 25, 2019.
(Continued)

*Primary Examiner* — Peter Keyworth
(74) *Attorney, Agent, or Firm* — Stites & Harbison PLLC; Warren D. Schickli

(57) ABSTRACT

A method and apparatus are provided for removing EPA regulated chemical species from industrial wastewater using green rust. The apparatus includes a green rust generator having an iron anode and a carbon cathode.

10 Claims, 3 Drawing Sheets

(51) Int. Cl.
*C02F 1/52* (2006.01)
*C02F 1/38* (2006.01)
*C02F 1/467* (2006.01)
*C02F 101/10* (2006.01)
*C02F 101/16* (2006.01)

(56) References Cited

U.S. PATENT DOCUMENTS

| | | | |
|---|---|---|---|
| 5,358,643 A | 10/1994 | McClintock | |
| 5,368,703 A | 11/1994 | Brewster | |
| 6,080,300 A | 6/2000 | Goodwin | |
| 6,235,204 B1 | 5/2001 | Castaldi et al. | |
| 6,719,894 B2 | 4/2004 | Gavrel et al. | |
| 7,115,201 B2 | 10/2006 | Rey | |
| 7,892,426 B2 | 2/2011 | Hayashi et al. | |
| 8,211,290 B2 | 7/2012 | Suominen | |
| 8,652,427 B2 | 2/2014 | Liu et al. | |
| 8,845,906 B2 | 9/2014 | Henley | |
| 9,181,119 B2 | 11/2015 | Fresnel | |
| 9,284,200 B2 | 3/2016 | Ma | |
| 9,776,895 B2 | 10/2017 | Alcantar et al. | |
| 9,963,360 B2 | 5/2018 | Kratochvil et al. | |
| 9,963,368 B2 | 5/2018 | Baseeth et al. | |
| 2003/0132166 A1* | 7/2003 | Rey | C02F 9/00 210/721 |
| 2004/0031761 A1* | 2/2004 | Wunsche | C02F 1/467 204/242 |
| 2008/0241055 A1 | 10/2008 | Kawase et al. | |
| 2009/0028770 A1 | 1/2009 | Mae et al. | |
| 2011/0303871 A1* | 12/2011 | Burba | B01J 20/0207 210/660 |
| 2017/0225991 A1 | 8/2017 | Gadgil et al. | |
| 2020/0277207 A1* | 9/2020 | Park | C02F 1/46109 |

FOREIGN PATENT DOCUMENTS

| | | |
|---|---|---|
| JP | 2009148749 A | 7/2009 |
| JP | 2009148750 A | 7/2009 |
| JP | 6347886 | 6/2018 |

OTHER PUBLICATIONS

English machine translation of JP2009148749 obtained from espacenet.com on Jan. 25, 2019.
English machine translation of JP2009148750 obtained from espacenet.com on Jan. 25, 2019.
English machine translation of JP6347886 obtained from espacenet.com on Jan. 25, 2019.
English machine translation of DE102012108399.

\* cited by examiner

APPARATUS TO REMOVE HARMFUL CHEMICAL SPECIES FROM INDUSTRIAL WASTEWATER USING IRON-BASED PRODUCTS

RELATED APPLICATION

This application claims priority to U.S. Provisional Patent Application Ser. No. 62/848,193 filed on May 15, 2019, which is hereby incorporated by reference in its entirety.

GOVERNMENT SUPPORT

This invention was made with government support under Grant No. DE-FE00031555 awarded by the Department of Energy. The government has certain rights in the invention.

TECHNICAL FIELD

This document relates generally to methods and apparatus for green rust production as well as to methods and apparatus for removing environmentally harmful and EPA regulated chemical species from industrial wastewater including, for example, the wet flue gas desulfurization water blowdown generated at coal fired power plants and the like.

BACKGROUND

In conventional electrocoagulation units, iron is used as both the anode and the cathode in order to generate green rust (GR). Green rust is a particular iron corrosion compound that forms in the presence of dissolved iron species and chloride (green rust type 1, GR1) and/or sulfate (green rust type 2, GR2). The iron anode is the source of the dissolved iron.

The green rust is capable of highly selective removal of EPA regulated chemical species such as selenite/selenate, arsenite/arsenate and nitrite/nitrate from an aqueous stream through a combination of absorption and ion exchange. Thus, green rust may be used to cleanse industrial wastewater streams such as those emanating from coal-fired power plants, such as fly ash blowdown, oil and gas industry processing plants and mine drainage.

By using iron as both electrodes, dissolved iron species can be formed from either location simply by "flipping" the electrical leads on the power supply. The cathode in these conventional cells is simply viewed as a "sink" for electrons, and therefore not deemed particularly important to the overall operation.

In contrast, in the method disclosed in this document, carbon is used as the cathode. Such a carbon cathode not only functions as a "sink" for electrons but also functions to generate hydrogen peroxide and/or hypochlorite in addition to conventional hydroxide production and lower the overall energy requirement of the process when oxygen is present (oxygen reduction takes less energy than water reduction to hydrogen gas).

With standard metal electrodes, such as iron, dissolved oxygen is reduced to hydroxide or water (using 4 electrons) as opposed to hydrogen peroxide (using 2 electrons). Carbon is specifically known to reduce dissolved oxygen to hydrogen peroxide with vastly higher efficiencies than metal electrodes. Advantageously, the generated hydrogen peroxide is a strong oxidizer that can play a key role in the iron oxidation process. The formation of green rust will depend on certain concentrations of $Fe^{2+}$ and $Fe^{3+}$ to be present. In certain cases, hydrogen peroxide appears to increase the rate of green rust formation, which will subsequently decrease the overall electrolysis time and size required for certain equipment. In certain designs, air can be fed to this carbon cathode to provide continuous generation of hydrogen peroxide. The surface area of the carbon and rate of air feed will impact the hydrogen peroxide formation rate, and the use of a high surface area carbon cathode is preferred here. Finally, due to the presence of dissolved oxygen reduction at the carbon cathode, this electrocoagulation process does not need to be specifically sealed from the atmosphere, which will help in limiting the complexity of the apparatus and process.

SUMMARY

In accordance with the purposes and benefits described herein, a new and improved method of treating industrial wastewater is provided. That method includes the steps of: (a) generating green rust by iron electrolysis using an iron anode and a carbon cathode, (b) mixing the green rust with the industrial wastewater to react selenium, arsenic and nitrite/nitrate species in the industrial wastewater with the green rust and (c) solidifying and separating the selenium, arsenic and nitrite/nitrate species from the treated industrial wastewater.

In one or more of the many possible embodiments of the method, the method also includes the step of generating at least one of hydrogen peroxide ($H_2O_2$) and hypochlorite ($ClO^-$) at the carbon cathode and lowering the overall energy required to generate the green rust.

In one or more of the many possible embodiments of the method, the method also includes the step of feeding air to the carbon cathode to support the generation of at least one of the hydrogen peroxide and the hypochlorite.

In one or more of the many possible embodiments of the method, the method also includes the step of concentrating the green rust prior to the mixing the green rust with the industrial wastewater.

In one or more of the many possible embodiments of the method, the method also includes the step of concentrating the green rust in a hydrocyclone before the mixing with the industrial wastewater in a reactor.

In one or more of the many possible embodiments of the method, the method also includes the step of completing the separating of the selenium, arsenic and nitrite/nitrate species from the treated industrial wastewater in a solid-liquid reactor or separator.

In one or more of the many possible embodiments of the method, the method also includes the step of adding a modified anionic starch to the solid-liquid reactor or separator. The modified anionic starch functions as a coagulant to flocculate and settle down fine green rust particles for more efficient separation.

In accordance with an additional aspect, a new and improved method of generating green rust by iron electrolysis comprises: (a) using an iron anode and a carbon cathode, (b) passing a current across the iron anode and the carbon cathode and (c) generating at least one of hydrogen peroxide and hypochlorite at the carbon cathode and thereby lowering overall energy required to generate the green rust.

In one or more of the many possible embodiments of the method, the method also includes the step of feeding air to the carbon cathode to support the generation of at least one of the hydrogen peroxide and hypochlorite.

In accordance with yet another aspect, an apparatus is provided that is adapted or configured for removing EPA regulated chemical species from industrial wastewater. That apparatus comprises: (a) a green rust generator including an iron anode, a carbon cathode and a current source, (b) a reactor configured for mixing the green rust generated in the green rust generator with the industrial wastewater and (c) a solid-liquid reactor or separator configured for removing the EPA regulated chemical species from treated industrial wastewater. For purposes of this document, "EPA regulated species" refers to selenium, arsenic and nitrite/nitrate species.

In one or more of the many possible embodiments of the method, the method also removes oxyanion from water to be treated. The term oxyanion covers a broad range of chemical species including, but not necessarily limited to, selenate, nitrate, arsenate, chromate, permanganate and the like.

In one or more of the many possible embodiments of the apparatus, the apparatus also includes a hydrocyclone adapted for concentrating the green rust, downstream from the green rust generator and upstream from the reactor.

In one or more of the many possible embodiments of the apparatus, the reactor is a spouting bed reactor at a lower section thereof and a counter-current moving bed at an upper section thereof.

In one or more of the many possible embodiments of the apparatus, the apparatus further includes an anionic starch flocculant in the solid-liquid reactor or separator adapted to function as a coagulant to flocculate and settle down fine green rust particles for more efficient separation.

In accordance with yet another aspect, a new and improved green rust generator is provided. That green rust generator comprises (a) a vessel holding an aqueous solution and (b) an electrolysis system including an iron anode, a carbon cathode and a current source for passing a current across the iron anode and the carbon cathode in contact with the aqueous solution.

In one or more of the many possible embodiments of the green rust generator, the green rust generator also includes an air feeding element adapted to feed air to the carbon cathode to support generation of at least one of hydrogen peroxide and hypochlorite.

In the following description, there are shown and described several embodiments of the new and improved (a) method of treating industrial wastewater, (b) method of generating green rust by iron electrolysis, (c) apparatus for removing EPA regulated chemical species from industrial wastewater and (d) green rust generator. As it should be realized, the methods and apparatus are capable of other, different embodiments and their several details are capable of modification in various, obvious aspects all without departing from the methods and apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the patent specification, illustrate several aspects of the methods and apparatus and together with the description serve to explain certain principles thereof.

DETAILED DESCRIPTION

Figure 1:
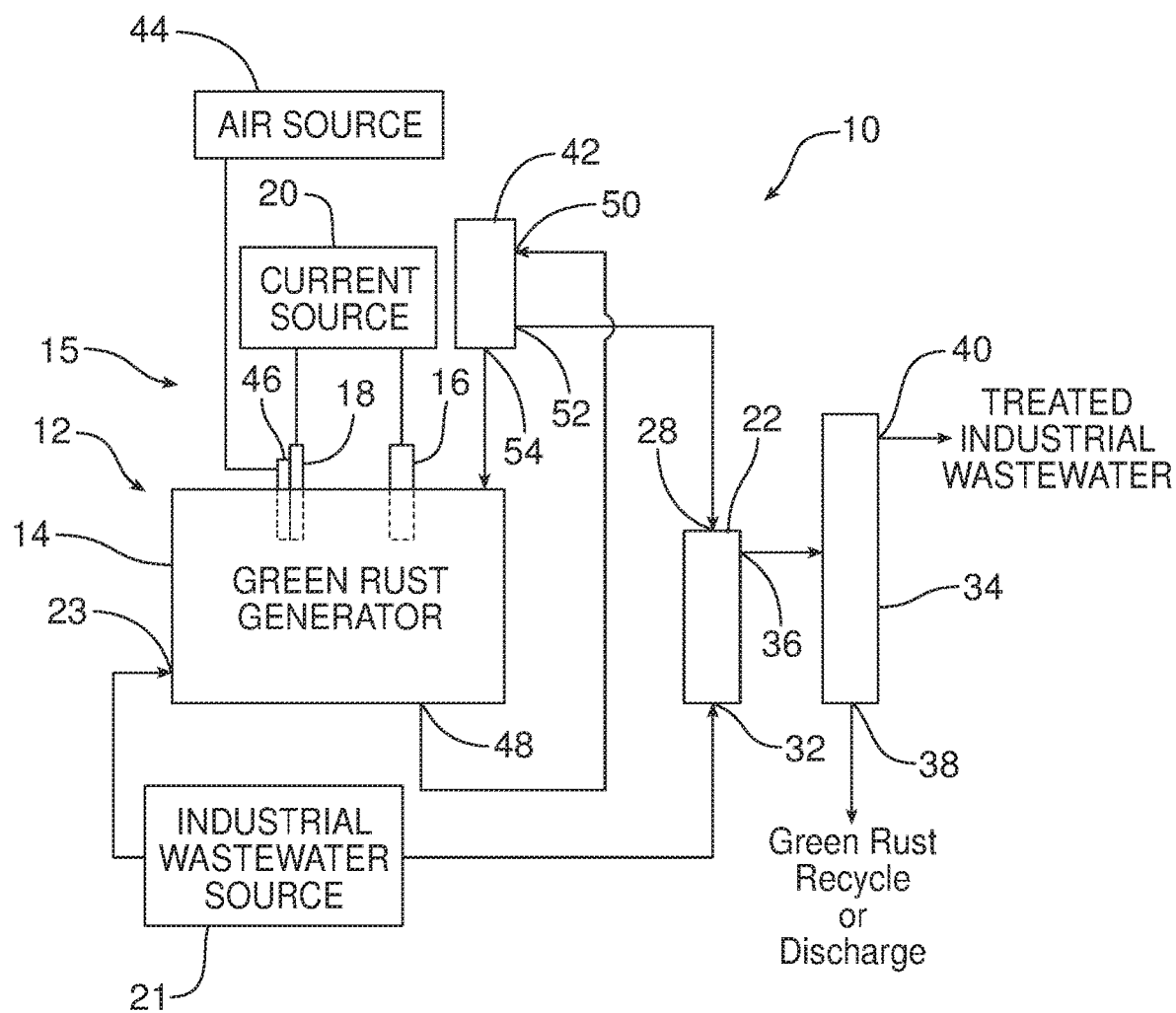
FIG. 1 is a schematic illustration of the apparatus adapted for removing EPA regulated chemical species from industrial wastewater including the new and improved green rust generator.

Reference is now made to FIG. 1 which schematically illustrates the new and improved apparatus 10 configured or adapted for removing EPA regulated chemical species from industrial wastewater. Those EPA regulated chemical species include, but are not necessarily limited to, selenium, arsenic and various nitrite and nitrate species that are potentially harmful to the environment. For purposes of this document, "industrial wastewater" refers to wastewater from industrial processing including, but not necessarily limited to, wet flue gas desulfurization water blowdown (WFGDWB), produced water streams and ash pond discharge.

The apparatus 10 includes a green rust generator 12. The green rust generator 12 includes (a) a vessel 14, and (b) an electrolysis system, generally designated by reference numeral 15. The electrolysis 15 includes an iron anode 16, a carbon cathode 18 and a current source 20 adapted for generating green rust by iron electrolysis. The vessel 14 holds an aqueous solution in contact with the iron anode 16 and carbon cathode 18. Where the aqueous solution is industrial wastewater including dissolved oxygen, the dissolved oxygen is reduced to hydrogen peroxide at the carbon cathode 18. Where the industrial wastewater includes dissolved chloride, the dissolved chloride is reduced to hypochlorite at the carbon cathode 18.

In one particularly useful embodiment, the carbon cathode 18 is made from a relatively high surface area carbon material. Preferably the carbon cathode 18 has a surface area of at least 1 $m^2/g$. The current source 20 may be adapted to deliver an electrical potential across the iron anode 16 and carbon cathode 18 of between, for example, 1 V and 10 V.

As the electrolysis time and/or the magnitude of the current in the green rust generator 12 is increased, more green rust is formed, thereby increasing the green rust concentration. Concentrations of 10-21 wt % are possible. The higher the green rust concentration, the higher the removal rate of the EPA regulated chemical species thereby reducing the size and capital cost of the downstream equipment.

The apparatus 10 also includes a reactor 22 configured for mixing the green rust generated in the green rust generator 12 with the industrial wastewater. The reactor 22 can assume a number of different configurations including, but not necessarily limited to a batch reactor, a fluidized bed and a spouting bed. In order to increase the kinetics and decrease the size of the required reactor 22, contact between the green rust and the industrial wastewater influent needs to be maximized.

Figure 2:
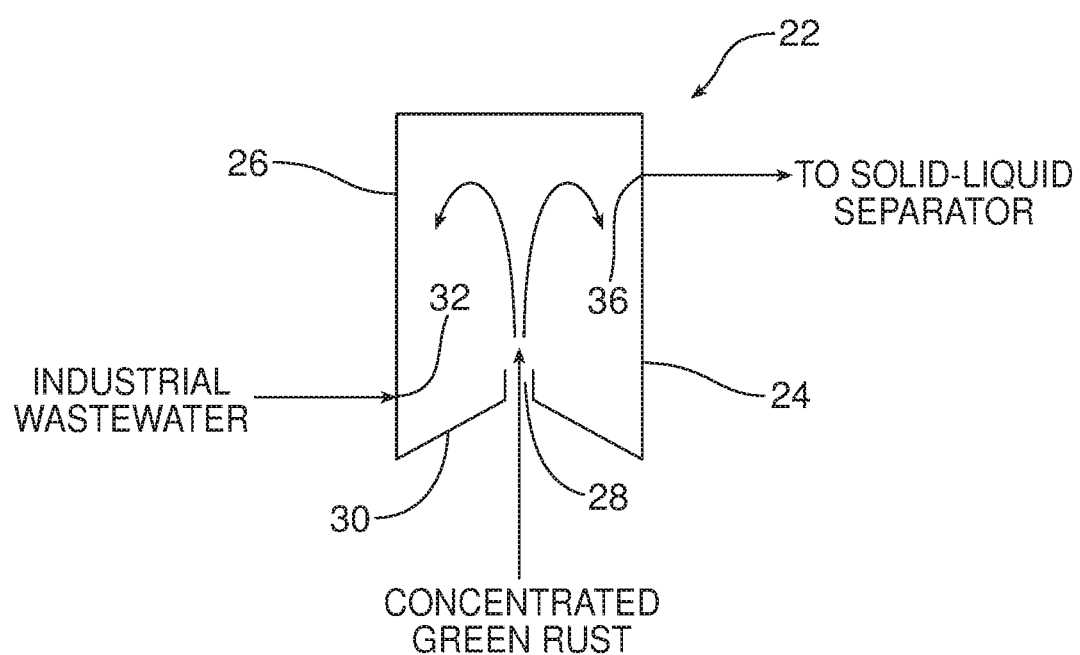
FIG. 2 is a schematic illustration of the reactor used in the apparatus of FIG. 1.

FIG. 2 illustrates one configuration of reactor 22 particularly suited for this purpose. That reactor 22 has a spouting bed reactor configuration at the lower section 24 and a counter-current moving bed reactor configuration at an upper section 26. Thus, as illustrated in FIG. 2, the lower section 24 may have a central inlet 28 for delivering concentrated green rust into the reactor 22 and an inverted frustoconical bottom wall 30. The industrial wastewater is delivered to the reactor 22 at a sidewall inlet 32 aligned with or below the central inlet 28. As should be appreciated, the green rust travels through a "cone" and into the solution forming a recirculating profile in the solution (note action arrows). This recirculation enhances the contact between the industrial wastewater and the green rust being fed into the reactor from the side prior to leaving the top of the reactor for the solid-liquid separator 34. The EPA regulated chemical species, including selenium, arsenic, nitrite and nitrate species, in the industrial wastewater are removed from the industrial wastewater by their interaction with the green rust.

The resulting treated industrial wastewater and concentrated green rust mixture made in the reactor 22 is delivered to a downstream solid-liquid reactor or separator 34 through the discharge outlet 36 located at the upper section 26 of the reactor 22. The solid-liquid separator 34 is configured for separating the EPA regulated species and the green rust from the treated industrial wastewater. More specifically, the green rust and any captured EPA regulated chemical species is discharged from a discharge outlet 38 at the bottom of the solid-liquid separator 34 while the treated industrial wastewater with EPA regulated species removed is discharged from a treated industrial wastewater outlet 40 near the top of the solid-liquid separator 34.

In one or more embodiments of the apparatus 10, an optional hydrocyclone 42 is provided downstream from the green rust generator 12 and upstream from the reactor 22. The hydrocyclone 42 is adapted to concentrate the green rust received from the green rust generator in order to improve the efficient operation of the apparatus. Where the apparatus 10 includes the optional hydrocyclone 42, it is possible to monitor the energy expended through the current source 20 during the iron electrolysis process and the energy used by the hydrocyclone and balance the two to minimize overall energy input and reduce the operating costs of the process.

The apparatus 10 is useful in a method of treating industrial wastewater. That method includes the steps of: (a) generating green rust in a green rust generator 12 by iron electrolysis using the iron anode 16 and the carbon cathode 18, (b) mixing the green rust with the industrial wastewater in the reactor 22 to react EPA regulated species, including selenium, arsenic and nitrite/nitrate species, in the industrial wastewater with the green rust (by ion exchange and/or adsorption) and (c) solidifying and separating the selenium, arsenic and nitrite/nitrate species from the treated industrial wastewater.

Toward this end, the method includes the step of generating at least one of hydrogen peroxide and hypochlorite at the carbon cathode 18. This provides two significant benefits: The first benefit is a reduction in the overall energy required to generate the green rust. The second benefit is that the hydrogen peroxide and hypochlorite are both biocides that potentially mitigate microbial growth in the industrial wastewater.

The method may also include the step of feeding air to the carbon cathode 18 in contact with the aqueous solution in the vessel 14 of the green rust generator 12 in order to support the generation of at least one of the hydrogen peroxide and the hypochlorite (note air source 44 connected to the air feeding element 46 illustrated in FIG. 1). That air feeding element may comprise an air sparger or other appropriate structure for delivering air into the aqueous solution in the vessel in close proximity to the carbon cathode 18.

The green rust generated in the green rust generator 12 may be discharged from the outlet and delivered to the optional hydrocyclone 42 at the inlet 50. The hydrocyclone functions to concentrate the green rust which is then delivered through the outlet 52 to the inlet of the reactor 22. Excess industrial wastewater is returned to the green rust generator 12 though the outlet 54.

The method also includes the step of completing the separating of the EPA regulated species (e.g. selenium, arsenic and nitrite/nitrate species) from the treated industrial wastewater in the solid-liquid separator 34.

Toward this end, the method may include the step of adding a modified anionic starch to the solid-liquid separator 34. The modified starch functions as a coagulant to flocculate and settle down the fine green rust particles for more efficient separation. This allows for a reduction in the size of the separator column 34, leading to a lower overall cost process. Starch is a highly polymerized carbohydrate with a molecular formula of $(C6H10O5)_n$. In this method, the starch is chemically modified using sodium hydroxide resulting in an anionic starch, which improves its water solubility, greatly reduces the content of water-insoluble substances, increases the stability of viscosity, and thus strengthens the flocculation of starch. The modification can be carried out as follows: (1) weigh 30 g starch and 1.2 g sodium hydroxide, (2) after dissolving sodium hydroxide in 500 mL of water, add to a 1 L volumetric flask (containing the starch), (3) heat the volumetric flask in a water bath while periodically stirring until the temperature reaches 90-95° C., and then hold for 1 hour, (4) fill the remaining volume of the 1 L volumetric flask with water and shake well. This procedure will produce a 3 wt % modified anionic starch that can be used as a flocculant to coagulate and settle down fine green rust particles.

EXPERIMENTAL

Construction Details:

GR generator was made of a 5 L PVC container consisting of a pair of iron anode and graphite cathode placed in the center of the container. Solid-liquid separator was made of a PVC column with a max holding volume of ~12 L.

Operation Details:

At the conditioning step, $Cl^-$ and $SO_4^{2-}$ containing water, e.g., wet flue gas desulfurization water blowdown, was first pumped into the GR generator in order to produce green rust via iron electrolysis. After some hours, e.g., 3 hours at 5 A, GR slurry (usually about 20 wt %) was formed and then pumped to the solid-liquid separator, in which GR solids were settled for recycle to the GR generator and/or discharge to landfill; and simultaneously, treated water containing disinfectant such as NaClO overflowed.

During operation, fresh WFGD water was continuously pumped into the GR generator and treated wet flue gas desulfurization water blowdown continuously overflowed at about 20 mL min$^{-1}$. Meanwhile, current used for GR production could be reduced, e.g., 2.5 A, as GR solids could be partly or fully recycled from the separator.

In order to further reduce dissolved iron in the treated water, the use of air flash may be necessary along with pH adjustment to form insoluble iron salts.

Figure 3:
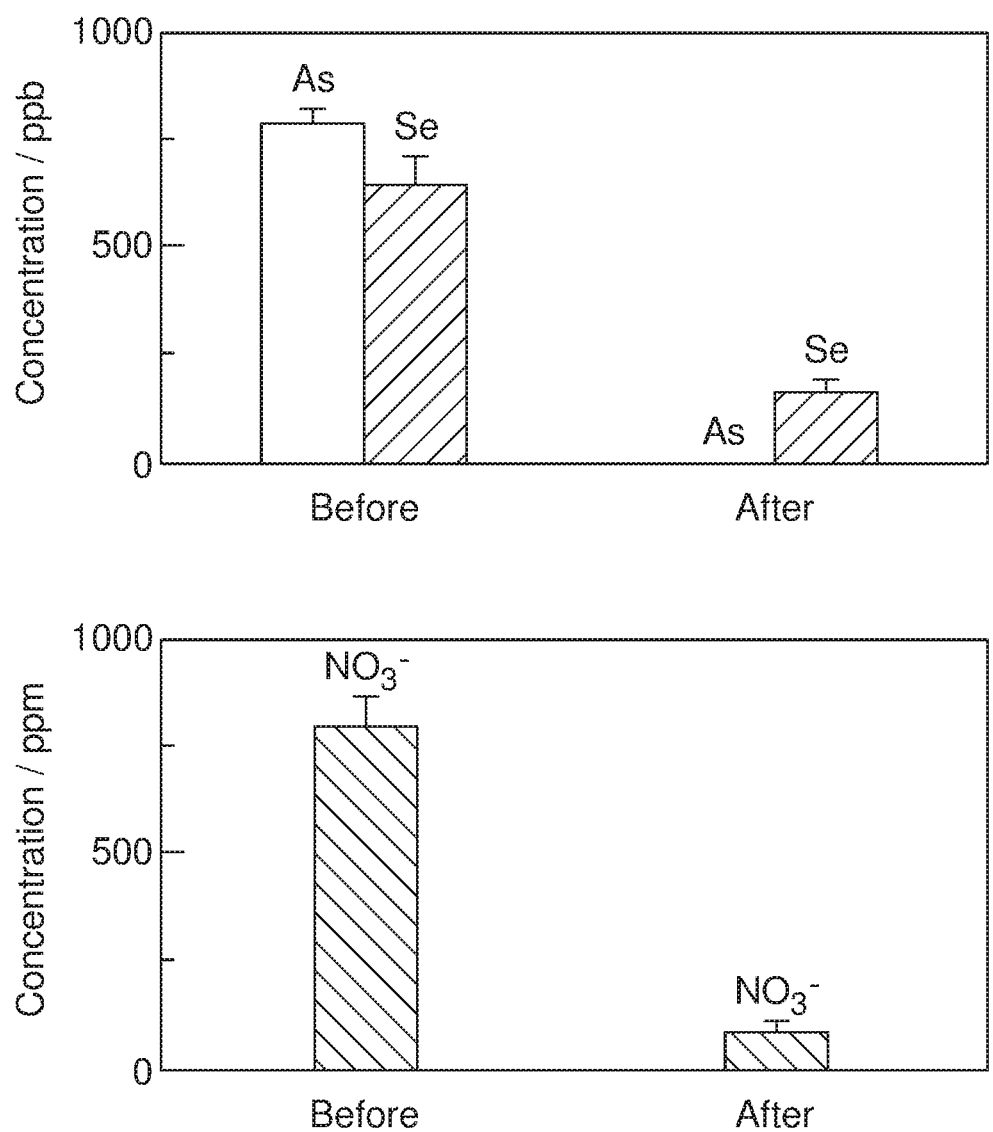
FIG. 3 illustrates changes in selenate, arsenate and nitrate concentrations before and after treatment.

Results:

Reference is made to FIG. 3 which illustrates changes in selenate, arsenate and nitrate concentrations before and after treatment.

The GR generator was first conditioned at 5 A for 3 hours to produce about 20 wt % GR. The setup was operated at 2.5 A and 20 mL min$^{-1}$ to continuously remove selenate, arsenate and nitrate.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of treating industrial wastewater, comprising:
generating green rust by iron electrolysis using an iron anode and a carbon cathode;
feeding air to the carbon cathode to support generation of at least one of hydrogen peroxide and hypochlorite at the carbon cathode to lower the overall energy required to generate the green rust;
mixing the green rust with the industrial wastewater to react selenium, arsenic and nitrite/nitrate species in the industrial wastewater with the green rust; and
solidifying and separating the selenium, arsenic and nitrite/nitrate species from the treated industrial wastewater.

2. The method of claim 1, including concentrating the green rust prior to the mixing the green rust with the industrial wastewater.

3. The method of claim 2, including concentrating the green rust in a hydrocyclone before the mixing with the industrial wastewater.

4. The method of claim 3, including completing the separating of the selenium, arsenic and nitrite/nitrate species from the industrial wastewater in a solid-liquid reactor or separator.

5. The method of claim 4, adding a modified anionic starch to the solid-liquid reactor or separator, the modified anionic starch functioning as a coagulant to flocculate and settle down fine green rust particles for more efficient separation.

6. The method of claim 1, including concentrating the green rust prior to the mixing the green rust with the industrial wastewater.

7. The method of claim 6, including concentrating the green rust in a hydrocyclone before the mixing with the industrial wastewater in a reactor.

8. The method of claim 1, including completing the separating of the selenium, arsenic and nitrite/nitrate species from the treated industrial wastewater in a solid-liquid reactor or separator.

9. The method of claim 8, adding a modified anionic starch to the solid-liquid reactor or separator, the modified anionic starch functioning as a flocculant to coagulate and settle down fine green rust particles for more efficient separation.

10. A method of generating green rust by iron electrolysis, comprising:
using an iron anode and a carbon cathode;
passing a current across the iron anode and the carbon cathode; and
feeding air to the carbon cathode to support the generation of at least one of the hydrogen peroxide and hypochlorite; and
generating at least one of hydrogen peroxide and hypochlorite at the carbon cathode and thereby lowering overall energy required to generate the green rust.

* * * * *